INVENTORS J. S. BOMBA
N. M. HALLER
E. R. KRETZMER
BY E J Oliver
ATTORNEY

INVENTORS: J. S. BOMBA
N. M. HALLER
E. R. KRETZMER
BY E J Oluder
ATTORNEY

INVENTORS: J. S. BOMBA
N. M. HALLER
E. R. KRETZMER
BY E. J. Oluder
ATTORNEY

INVENTORS: J. S. BOMBA
N. M. HALLER
E. R. KRETZMER
BY E J Oliver
ATTORNEY 3,050,581
Patented Aug. 21, 1962

3,050,581

LINE TRACING SYSTEM

James S. Bomba, Millburn, N.J., Neil M. Haller, Northport, N.Y., and Ernest R. Kretzmer, New Providence, N.J., assignors to Bell Telephone Laboratories, Incorporated, New York, N.Y., a corporation of New York Filed Aug. 30, 1960, Ser. No. 52,820
13 Claims. (Cl. 178—7.1)

Figure 1:
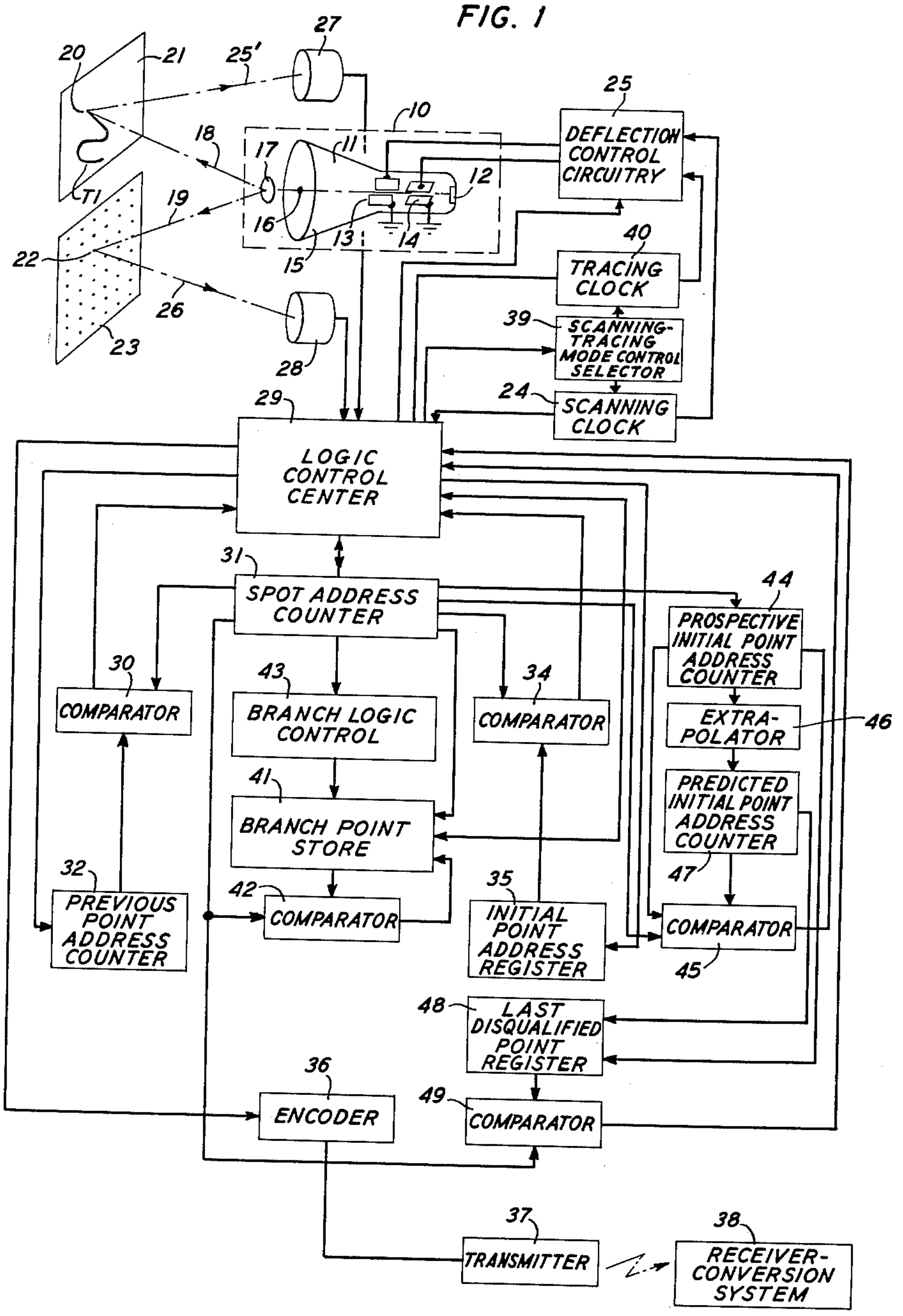

This invention relates to facsimile communications and more particularly to systems for translating simple line drawings into digital form.

A general object of the invention is to improve the efficiency of facsimile transmission and a more specific object is to reduce the digital information required to reproduce simple line drawings, alpha-numeric characters and other line patterns.

Conventional practice in facsimile communications requires that the photograph, drawing or text to be transmitted be scanned in its entirety. Typically, an identifying characteristic, such as black or white, for example, is determined for each dot or other elemental area encountered in the course of the scan and, in each instance, the characteristic is encoded for transmission. With respect to particular types of information, such as simple black and white line drawings or figures, for example, facsimile transmission of the type indicated is highly redundant. Redundancy may, for example, be evidenced by a high degree of likelihood that adjacent elemental areas or dots are of like kind. As a result, the transmission of an excessive amount of information representative of background or white space is required to define the relatively small area occupied by the black space.

In the prior art some attempts have been made to reduce the transmission inefficiency that is evidently inherent in conventional facsimile systems. One approach, for example, is the employment of "run-length" coding which provides for measuring the lengths of successive black or white "runs" encountered on each scanning line. The measured runs are encoded in binary digital form for transmission, thereby avoiding to some degree the redundancy which results from transmitting separately the characteristic of each dot or elemental area.

In accordance with the principles of the invention, redundancy in the facsimile transmission of information such as simple line drawings and line figures is virtually eliminated by translating the contour of the line into a plurality of discrete steps and by translating each discrete step into binary code form for transmission. In effect, the identity of each successive point on the line, after a selected initial point, is defined only in terms of its location in relation to the preceding point and only points on the line are encoded for transmission. It is this broad aspect of the invention which affords a substantial reduction in required transmission time and channel capacity over the facsimile systems of the prior art.

More specifically, the invention contemplates first the location of an initial point on the line to be transmitted, which may be accomplished by conventional scanning apparatus, for example. The identity or address of the initial point is then expressed in terms of its coordinate position in the field and the coordinates are encoded for transmission. Typically, the coordinate system used may employ conventional $x$ and $y$ axes and the unit increment in the system may be the average width of the line to be traced.

After the location of the initial point, the principles of the invention call for a local incremental search for the next point on the line. If, for example, a light beam which applies light to an elemental area is employed for scanning, the spot of light is stepped by one unit increment from the initial point in one or more of the four directions, $\pm x$ and $\pm y$. The light reflected at each step, commonly termed a video return signal, is analyzed to determine whether the light spot coincides with a part of the line. In the event of coincidence, the direction of the step, $+x$ for example, is registered and encoded for transmission and a new search is initiated from the newly discovered point. If the search in each of the coordinate directions is unsuccessful, the end of a line is indicated and apparatus responsive to this condition generates an appropriate terminating signal.

Within the scope of the principles of the invention, any one of a wide variety of coordinate systems or definition schemes may be employed. For example, for more definitive line tracing, the location of a point in relation to an adjacent point may be defined in terms of one out of eight, rather than one out of four possible increments. An illustrative eight-increment scheme employs the conventional four coordinate directions and the four intermediate directions.

An additional aspect of the invention deals with the problem of tracing and encoding branched lines. At a point on a line which marks the intersection of a plurality of branches, it is evident that the tracing spot may proceed in more than one coordinate direction to arrive at a point on one of the branches. Accordingly, means are provided for automatically storing the coordinate address of every branch point together with a notation of the coordinate direction of all untraced branches. When the trace reaches the end of a line, means are provided for automatically consulting the branch-point storage and for returning the trace, successively, to each branch point having untraced branches. This arrangement lends itself to a wide variety of programming schemes in which preferences may be assigned to particular directions of tracing when alternative paths are offered and in which consultation of the branch store is effected after the trace of each successive branch.

Another aspect of the invention deals with the problem of tracing a plurality of independent lines in a single field. In general, scanning techniques are employed to locate an initial point for each individual line and the coordinate address of each prospective point is compared with the stored addresses of all previous points in order to preclude a repeated transmission of the same point. Alternatively, the coordinate address of every candidate for transmission may be compared with the stored identity of predicted points whose addresses have been extrapolated from the addresses of points encountered on preceding scans.

In an illustrative embodiment of the invention the line tracing apparatus comprises a flying spot scanner which focuses a spot of light on any desired portion of the field. Means are provided for controlling the deflection of the scanner both in conventional raster fashion and in incremental steps. The light spot is also imaged on an array of coordinate dots, each dot being separated from adjacent dots in the $x$ and $y$ directions by the selected incremental distance. A first photodetector is employed to observe the line being traced and a second photodetector is employed to observe the array of coordinate dots.

The determination of whether the light spot is on the line being traced is effected by applying the video outputs of the two photodetectors to an AND gate. If the image of the light spot is on a coordinate dot, an AND gate output indicates that the two inputs are of like kind and hence that the spot coincides with a point on the line. Feedback is employed to make the preceding incremental deflection change sustaining and the coordinate direction of the change is registered and encoded for transmission. The absence of a feedback signal indicates a decision that the spot is off the line, the applied step is unsustaining, and the spot is returned to the search position which is the last position indicated as a point on the line.

Additional apparatus in the illustrative embodiment includes a source of clock pulses for controlling the sequence of operations, counters for registering the tracing steps, storage means for retaining the coordinate addresses of significant points, comparators for checking the address of the spot against the addresses of stored points and interconnecting logic circuitry for performing the various decision-making functions of the invention.

Although the line tracing aspects of the invention are disclosed in a facsimile system embodiment, it will be apparent to persons skilled in the art that the principles of the invention may also be employed in a character-recognition system. For example, information derived from tracing a line pattern may be temporarily stored and compared with permanently stored information of the same type that is representative of specific characters or preassigned patterns. If a comparison results in a suitable match, it is evident that the character traced is the same as a particular one of the permanently stored patterns, or, stated otherwise, the traced character has been "recognized."

Accordingly, one feature of the invention is a line tracing system based on a running, two-dimensional, differential-coordinate description of the line contour. A further feature is the combination, in a facsimile system, of apparatus for translating the contour of a line into a plurality of discrete steps and apparatus for translating each step into a binary code.

Another feature is a facsimile transmission scanning device with deflection controlled by the combined video outputs from the material to be reproduced and from a coordinate grid.

Still another feature of the invention is the combination, in a facsimile system, of line tracing means, which includes means for storing the identity of each branch point encountered on the trace, and logic circuitry which effects a return of the tracing means to successive branch points upon the termination of each line trace.

Figure 2:
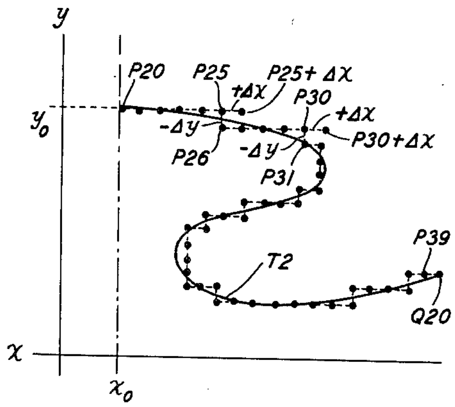
Figure 4:
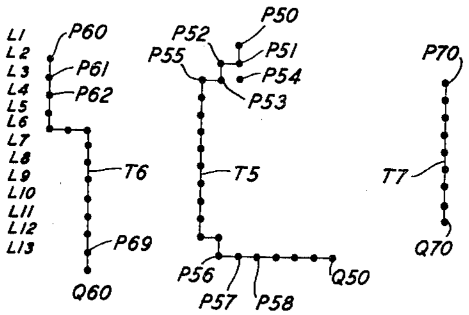
Figure 3:
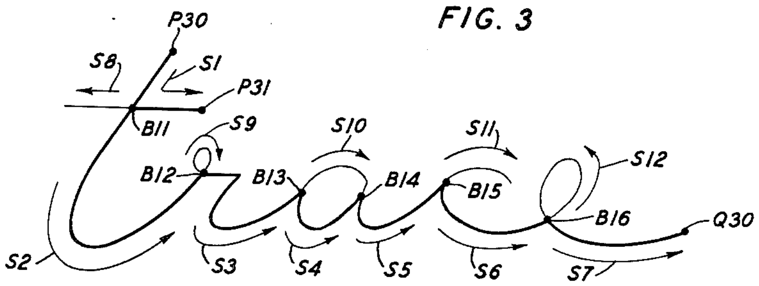
Figure 7:
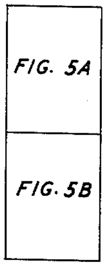
Figure 5A:
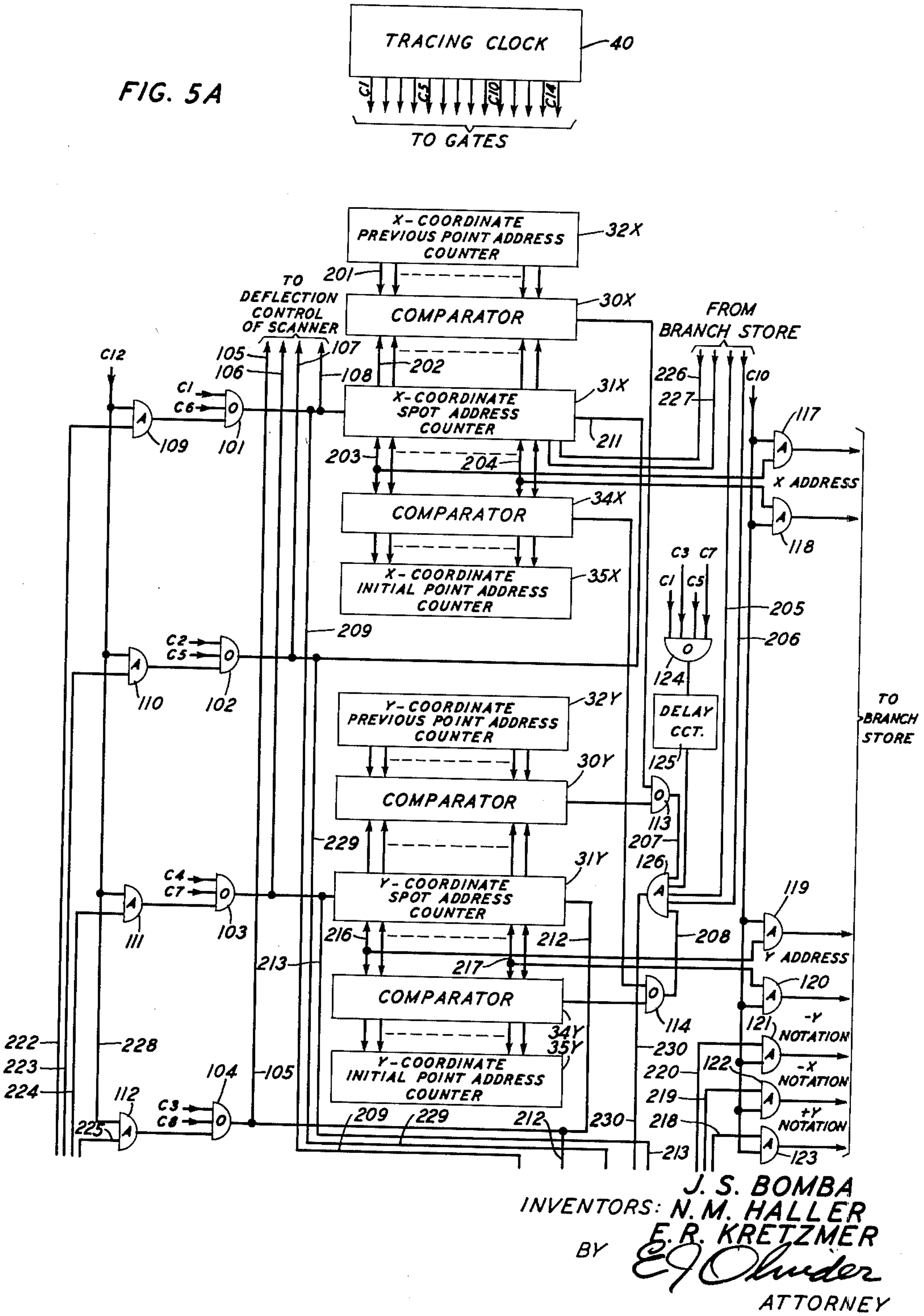
Figure 5B:
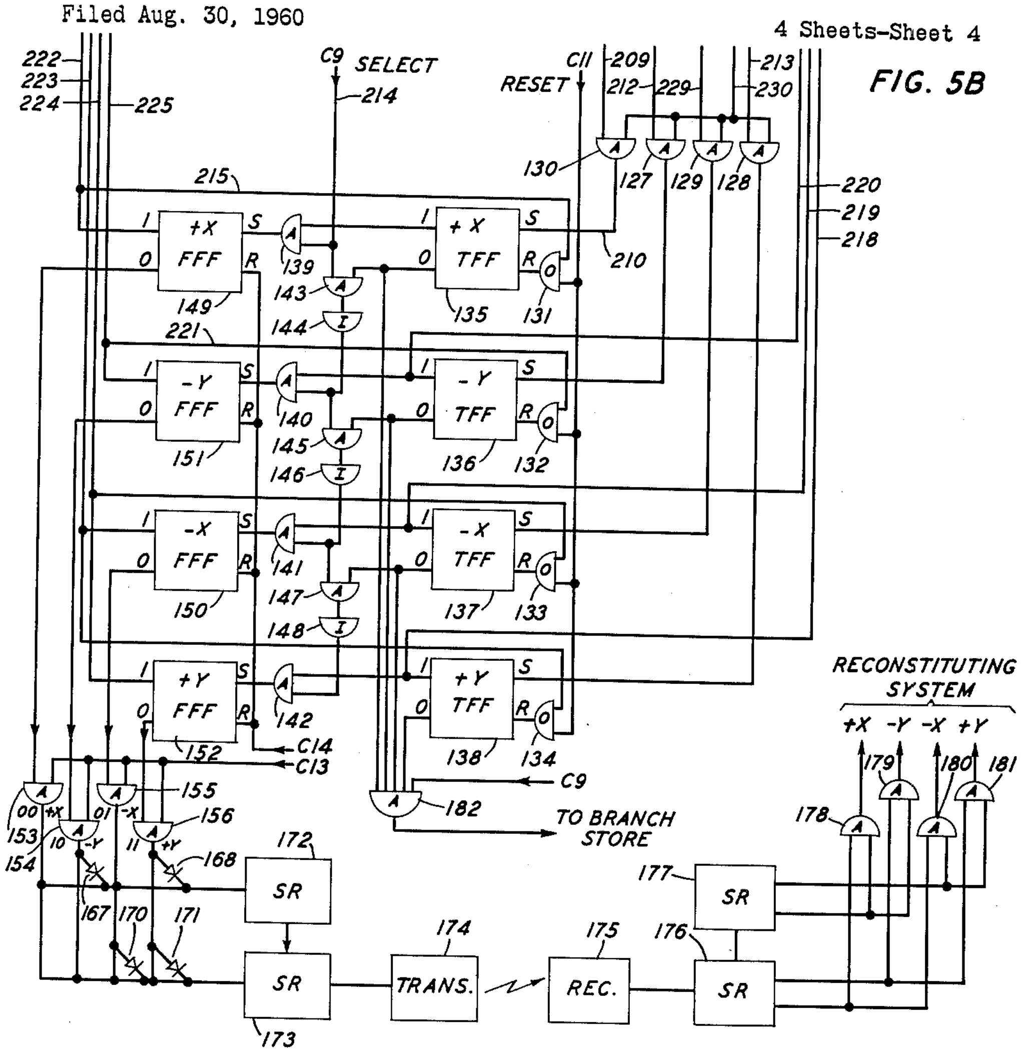

These and other features and objects of the invention will be fully apprehended from the following detailed description of an illustrative embodiment of the invention and from the appended drawings in which:

FIG. 1 is an over-all block schematic diagram of an illustrative embodiment of the invention;

FIGS. 2, 3, and 4 are diagrams of various line tracings performed by the embodiment shown in FIG. 1;

FIGS. 5A and 5B, together present a detailed block schematic diagram of a part of the apparatus shown in FIG. 1;

FIGS. 6A, 6B, 6C, and 6D are schematic diagrams of illustrative forms of certain of the circuit building-blocks of FIGS. 5A and 5B; and FIG. 7 is a block diagram showing the relation between FIGS. 5A and 5B.

FIG. 1 shows the transmitter portion of a facsimile line tracing system in accordance with the invention. It includes a scanner 10 which may be any one of a variety of devices well known in the art for translating the densities of elemental areas of line or pictorial copy into signal wave forms. Typically the scanner 10 may comprise a cathode-ray type of tube 11 including an electron gun 12 and horizontal and vertical deflecting plates 13 and 14 for directing the electron stream 15 to the face of the tube 11 on which the beam forms a light spot 16 in a well known manner. By a suitable lens arrangement 17 the light spot 16 is converted into two divergent beams of light 18 and 19, the first 18 forming a spot of light 20 on the copy to be traced 21 and the second 19 forming a spot of light 22 on an array of coordinate dots 23 comprising evenly spaced rows and columns.

In a broad sense, units of apparatus shown in FIG. 1 which are not a part of the actual scanning system may be regarded as a special-purpose computer. In accordance with the invention the computer drives the scanner 10 along the contour of the line to be traced in incremental steps and translates these steps into coded pulses for transmission. The function, structure, and interrelation of the individual units of the computer are disclosed in the following discussion of the operation of the system as it traces the line T1.

To locate an initial point on the line T1, the light beams 18 and 19 are stepped horizontally across the face of the copy 21 and across the coordinate dot array 23 in a raster type of scan. Each horizontal scan comprises a plurality of small steps and the distance of each step corresponds to the distance between adjacent coordinate dots, which in turn is selected, in accordance with the invention, to be approximately equal to the average width of the line T1 which is to be traced. Scanning is under the control of pulses, supplied by the scanning clock 24, which are applied to the deflection control circuitry 25. The scanning clock 24 is a pulse generator and may, for example, comprise a monostable or single trip multivibrator or a relaxation oscillator followed by a clipper. The deflection control circuitry 25 may comprise an arrangement similar to that employed in the television art, but utilizing staircase, sawtooth waves in which the individual steps, which correspond to the dots on the coordinate grid 23, are tallied by counters giving the instantaneous spot position.

As the field 21 is scanned, each of the reflected light beams or video return signals 25' and 26 is analyzed by a respective one of the two photodetector tubes 27 and 28. Each of the tubes 27 and 28, which may comprise any one of a variety of light-sensitive devices known in the art, is designed to produce an output when the light beam within its field has been reflected from a black area as opposed to a white or background area. More specifically, the tube 27 produces an output when there is a preselected degree of coincidence or overlap between the light spot 20 and an elemental area on the line T1, and the tube 28 produces an output when there is a preselected degree of coincidence or overlap between the light spot 22 and one of the coordinate dots.

A spot position is characterized as "stable" when there is a coincidence of outputs from the two photodetectors 27 and 28, which condition is indicated by an output from an AND gate, not shown, which is included in logic control center 29. The logic control center 29, which is to be described in some detail in the discussion of FIGS. 5A and 5B comprises various combinations of AND gates, OR gates and bistable multivibrators, hereinafter designated flip-flops, and its general function is to provide the interconnections which establish the proper cooperative relation among the various units of the system.

After the location of a stable point, the system shifts from the "scanning mode" to the "tracing mode" of operation in a manner yet to be described and certain checks are made to ensure that the point does not coincide with a point which has previously been encoded for transmission. One such check is performed by the comparator 30 which compares the address of the spot, which is maintained continuously by the spot-address counter 31 with the address of the last point transmitted which is held by the previous-point-address counter 32. It is evident that in the case of the initial stable point, there can be no match in the comparator 30 inasmuch as there is no "previous point." In the more general case of a succeeding stable point, however, the test for a match is necessary to prevent retracing. A match in the comparator 30 is indicated by an output signal which, when applied to the logic control center 29, inhibits the spot-address counter 31 from being advanced and accordingly prevents the encoding and transmission of a new address.

A similar check function is performed by the comparator 34 which tests for a match between the address in the spot-address counter 31 and the address in the initial-point-address register 35. Again, it is obvious that in testing a candidate for its validity as an initial point, there is no address in the initial-point-address register 35 and accordingly no match can be indicated by the comparator 34. However, in the more general case of testing the validity of a stable point other than an initial point, the last-mentioned check is essential in order to indicate whether a loop has been completed so that the retracing of the same loop may be prevented.

The counters 31 and 32, and the register 35 employed in the check functions described above, as well as additional counters and registers shown in FIG. 1, may comprise combinations of conventional flip-flops which perform the job of counting or registering by shifting abruptly from one to the other of their two stable conditions in response to appropriate input signals. One flip-flop is used for each of the information bits required to express the coordinate address of a point in binary language. The comparators 30 and 34, as well as other comparators shown in FIG. 1, are conventional in the computer art and may be designed in various ways to meet the requirements of the specific functions to be performed.

When the validity of a stable point has been established by the presence of a mismatch signal from the comparators 30 and 34, the condition is recognized in the logic control center 29 and signals are applied to advance or update the spot-address counter 31 and the previous-point-address counter 32. The encoder 36 is in turn responsive to changes in the spot-address counter 31. In the case of an initial point, the entire coordinate address is converted to binary form by the encoder 36. In the more general case of an intermediate point, however, only the coordinate direction of the incremental step taken from the immediately previous point is encoded. The following table is illustrative of the type of code conversion that may be employed:

| Step direction: | Code |
|---|---|
| $+x$ | 01 |
| $-y$ | 10 |
| $-x$ | 00 |
| $+y$ | 11 |

For transmission purposes, the convention of a pulse for a binary 1 and no-pulse for a binary 0 may be employed. Encoders for effecting the type of translation indicated are well known in the art and may, for example, comprise circuitry for applying the parallel outputs of conventional flip-flops to shift registers which produce a serial output.

The final output pulses are applied to the input of the transmitter 37, which may be wholly conventional. Additional temporary storage means may of course be interposed between the encoder 36 and the transmitter 37 to provide for relatively continuous rather than intermittent transmission. The receiver-conversion system 38, shown as a single block, comprises circuitry for reconstituting the trace from the received pulses, which circuitry, in the light of the features of the transmitter system disclosed herein, may readily be designed by persons skilled in the art.

As indicated above, the search for an initial point is conducted under the control of the scanning clock 24 which generates pulses for controlling the scan in raster fashion. After the location of an initial point, however, the system is shifted from the scanning mode to the tracing mode. The scanning-tracing mode control selector 39, under the control of circuitry in the logic control center 29, which in turn is responsive to the initial-point location conditions described, turns the scanning clock 24 Off and the tracing clock 40 On. Accordingly, the selector may, for example, comprise any suitably designed switch. The tracing clock 40, in addition to generating pulses for the operation of the deflection control circuitry 25 in a manner yet to be described, also generates pulses which initiate and control the sequence of certain operations performed by the circuitry of the logic-control center 29. Insofar as structure is concerned, the tracing clock 40 may comprise circuitry similar to that described for the scanning clock 24.

After the shift to the tracing mode, a unique search pattern is pursued by the scanner 10, under the control of the tracing clock 40, the logic control center 29 and the deflection control circuitry 25. Specifically, the light spot 20 is stepped one increment in the $+x$ direction and the new location is tested as to its stability, and, if stable, as to its validity, in the same fashion as described above for the initial point routine. Unless the candidate position is both stable and valid, the spot is not sustaining and is returned to the last stable point. The next pulse from the tracing clock 40 steps the light spot one increment in a second coordinate direction, then in a third, and finally in the fourth in search of a stable point. The particular order of the incremental steps in the search pattern is determined by the programming scheme built into the circuitry of the logic control center 29.

In tracing simple unbranched lines, a full four-direction search pattern may not be required if, for example, a stable point is located on the first search step. Consequently, in a system in accordance with the invention which is designed to trace only simple unbranched lines, the programming of the circuitry in the logic control center 29 is arranged to advance the tracing spot in a sustaining fashion in the first coordinate direction which presents a stable point. In the event that a search in each coordinate direction discloses no stable point, except for the previous point, it is evident that the end of the line has been reached. The existence of this condition is detected in the logic control center 29 by an AND gate, not shown, and the resulting output signal is applied to the encoder 36 which responds with a suitable supervisory or "end-of-trace" signal.

An illustrative tracing path of the basic type described above is shown in FIG. 2. The trace of the line T2 is commenced at the initial point P20. Successive incremental steps in the $+x$ direction are taken until the point P25 is reached. A $+\Delta x$ step to the point P25$+\Delta x$ produces no coincidence between the video return from the line and the video return from the coordinate dots 23, shown in FIG. 1, and accordingly, this point is rejected. However, a $-\Delta y$ step to the point P26 does produce coincidence and the $-y$ notation is encoded for transmission in the fashion described above. A similar sequence of events occurs in the rejection of the point P30$+\Delta x$ and in the acceptance of the point P31. The trace is completed upon reaching the terminal point Q20 for at that point, the only successful trial increment to be made is in the $-x$ direction to the point P39. Point P39 is disqualified, however, by a match between the previous-point-address counter 32 and the spot-address counter 31 which is detected by comparator 30 of FIG. 1.

Thus far, the embodiment has been discussed only in terms of its operation in the tracing of a single unbranched line. If a branched line is to be traced, however, certain additional aspects of the invention are involved. As described above, after the location of each stable point and the establishment of its validity by the checks performed by the comparators 30 and 34 shown in FIG. 1, a search is made for the next adjacent stable point. By means of the particular program designed into the circuitry of the logic control center 29, a preferred order of search is established. For example, the order may be $+x$, $-y$, $-x$, $+y$. At a branch point, each of the coordinate directions must be explored by one incremental step inasmuch as a choice of two or more adjacent stable points is presented. For example, a stable point may be located in the $+x$ direction, in the $-y$ direction and in the $-x$ direction. The logic control center 29 includes circuitry responsive to this condition for establishing a connection whereby the coordinate address of the branch point, which is temporarily set in the spot-address counter 31, is stored in the branched-point store 41 together with a notation indicative of the direction of each of the branches but one. One direction, designated the "preferred direction," which may be $+x$, for example, is omitted from the branch-point store 41 inasmuch as the succeeding sustaining step of the trace is to be made in that direction. Accordingly, a "memory" of that direction as an untraced branch need not be retained after the sustaining step in that direction is taken. After the completion of the search and storage operations described, the previous-point-address counter 32 and the spot-address counter 31 are stepped and the $+x$ increment is encoded for transmission. A new search based at the branch-point $+\Delta x$ location is then initiated.

The branch-point store 41 may comprise any conventional storage system with sufficient capacity for storing branch-point addresses and associated branch notations. In one embodiment, for example, the branch-point store comprises a magnetic core storage matrix.

In accordance with a feature of the invention means are provided for recognizing a branch point if it is encountered a second time, which may occur, for example, at the completion of a loop in a line pattern. Such recognition is provided for by the comparator 42 (FIG. 1) which applies an output signal to the branch-point store 41 whenever there is correspondence between the spot-address counter 31 and the address of a point in the branch-point store 41. A signal indicating the coordinate direction of a preferred one of the untraced branches is then applied to the logic control center 29 from the branch-point store 41 and, in turn, suitable signals are applied to the deflection control circuitry 25, to the spot-address counter 31, and to the previous-point-address counter 32.

The features of the invention additionally include an arrangement for dealing with the "end-of-line" problem under conditions requiring branch-point storage. Specifically, the logic control center 29, in response to an end-of-line condition, effects a consultation of the branch-point store 41. If the branch-point store 41 is empty, the attendant signal coincidence, with the end-of-line condition, results in an end-of-trace supervisory signal as described above. This action is followed by a return to the scanning mode as a preparatory step in conducting a search for any additional contours that may be included in the field. If the branch-point store 41 does hold a branch-point address, however, responsive circuitry in the logic control center 29, in combination with the deflection control circuitry 25, moves the spot to the branch point and thence in the coordinate direction of each of the untraced branches in preassigned sequence.

In the event that the branch-point store 41 holds the addresses of several branch points, each including notations indicative of the directions of their respective branches, a preferred order of branch-point tracing must be established. For example, the order may be the same in which the branch points are stored, it may be the inverse order, or it may be an order dictated by the type of line patterns most frequently traced. The box labeled branch-logic control 43 is employed to indicate the inclusion of circuitry designed to effect the desired order of outputs from branch-point store 41. Such preference type circuitry is well known and may, for example, comprise a ring counter located in the access circuitry of the branch-point store 41.

The application of the principles of the invention to the tracing of a rather complex pattern which includes a number of branch points is illustrated in FIG. 3. The word "trace" is shown written in cursive script with notations indicating the sequence in which the various segments and branch points are traced. Assume first that the order $+x$, $-y$, $-x$, $+y$ has been established as the preferred sequence of tracing directions. Accordingly, after the location of the initial point P30, tracing proceeds in the manner explained in the discussion of FIGS. 1 and 2.

At the branch-point B11, it will be noted that the trace may proceed in any one of the three coordinate directions $+x$, $-y$, or $-x$. The direcion $+y$ may be disregarded inasmuch as a retracing in that direction is precluded by the comparator match between the spot position at B11$+\Delta y$ and the address of the "previous point." Further, insofar as branch-point storage information is concerned, the $+x$ direction is disregarded; $+x$ is the preferred direction of trace and will be taken at the conclusion of the routine $+\Delta x$, $-\Delta y$, $+\Delta x$, $-\Delta y$ search. Accordingly, the total information placed in the branch-point store is the address of point B11, the notation $-y$ and the notation $-x$.

After completion of the segment S1, the terminal point P31 is reached, the branch-point store is consulted, the spot is returned to point B11 and, as a result of the preferred status of the $-y$ notation over the $-x$ notation, tracing of the segment S2 is undertaken. In similar fashion, tracing of the segments S3 through S7 is completed and the addresses of the branch points B12 through B16 are stored in the branch-point store together with appropriate $x$ and $y$ notations.

Assuming that the preferred order of branch-point consultation is the order in which the points were stored, the trace is returned to point B11 from the terminal point Q30 and the segment S8 is traced. In similar fashion, the trace is advanced to a succeeding branch point after the completion of each branch trace. Upon reaching point B16, the second time after tracing the segment S12, it is found that all branch points have been explored and an end-of-trace signal is initiated.

The features of the invention also provide a solution to the problem of locating the initial point of a second line in a field upon the termination of the trace of a first line. Circuitry in the logic control center 29, shown in FIG 1, responsive to the coincidence of a signal indicating an increment scan failure in each of the coordinate directions and a signal indicating an empty branch-point store 41 is designed to operate the scanning-tracing, mode-control selector 39 to shift the system back to the scanning mode.

When operating in the scanning mode, the location of a stable point, as previously described, presents the problem of identifying the position either as a point on a new line or as a point on a line previously traced. One solution is to provide a master store for registering the address of every stable point. Apparatus with a relatively large storage capacity, such as an electrostatic storage tube, for example, may be employed. The address of each point presented as a candidate for a new initial point may then be compared with the addresses of the points in the master store and in the case of a match, the candidate is rejected.

FIG. 1 shows a somewhat different arrangement for checking the validity of new initial-point candidates which require substantially less storage capacity than the master store system described above. Briefly, when the first line of a plurality of independent lines is traced, the addresses of certain key points, in addition to the initial point, are stored in the prospective-initial-point-address counter 44. After the trace of the first line has been completed, and the system has shifted to the scanning mode in search of a new initial point, each initial point candidate is compared in the comparator 45 with the addresses of the stored points and in case of a match, the candidate is disqualified by means of an inhibit signal from the comparator 45 to the logic control center 29. Additionally, before each shift to the next lower horizontal scan line is made, the extrapolator 46 is employed to predict the addresses of points on the previously traced curve which lie on the next scan line. Prediction is accomplished simply by extrapolating vertically down from the initial point through the stored points. Addresses of the extrapolated points replace the addresses in the prospective initial-point-address counter 44 on each vertical step of the raster scan and newly extrapolated points are stored in the predicted-initial-point-address counter 47. The extrapolator 46 may comprise a simple translating circuit which in effect increments the $y$ coordinate of each address received from the prospective-initial-point-address counter 44 before its transfer to the predicted-initial-point-address counter 47. The test for a disqualifying match between the spot address and each prospective initial point and between the spot address and each predicted initial point is made by the comparator 45.

Additional details of the initial-point recognition features of the invention are best explained by reference to FIG. 4 which shows a pattern of three non-intersecting lines T5, T6, and T7. Assume first that the line T5 has already been traced, and that the system has been switched to the scanning mode of operation.

Upon return to the scanning mode, the spot is first returned to point 50, the initial point of line T5. However, point 50 is rejected as a new initial point for the reason that it is stored in the initial-point-address register 35, shown in FIG. 1. Point P60, the next point encountered, satisfies all conditions for a new initial point, the system shifts to the tracing mode, and the trace of the line T6 is completed at the terminal point Q60.

Upon returning again to the scanning mode, a point P60 is rejected as an initial point candidate because of a match with the initial-point-address register 35. Additionally, points P51 and P52 are rejected. This rejection occurs as a consequence of the storage effected during the tracing of the line T5. Specifically, during the tracing of line T5, the coordinates of all points lying on scan line L2, namely points P51 and P52, preceded by the coordinates of P50 were stored in the prospective-initial-point-address counter 44, shown in FIG. 1. Accordingly, on the subsequent scanning of line L2, points P51 and P52 are correctly disqualified as initial-point candidates. More generally, on any contour, those points lying one scan line below an initial point are similarly stored and matched. These points are then used to estimate the coordinates of points such as P53 and P54 by extrapolation from point P50. In short, the position of points on lines previously traced which may be encountered on the next succeeding scan line are computed approximately just prior to the scanning of that line. As pointed out in connection with the discussion of FIG. 1, the procedure involves two ranks of counters, the first holding the starting point of the extrapolation, and the second the point through which the extrapolation is performed. The points resulting from the extrapolation then replace the points in the first counter and the process is repeated.

One further refinement designed to meet the type of situation shown in FIG. 4 is that the "match" required to disqualify a point as a new initial point need not be a direct match but instead is effected by any point which is adjacent to a non-qualifying point. Thus, on scan line L3 point P61 is rejected by a direct match, point P55 is rejected inasmuch as it is adjacent to the predicted point P53 and the predicted point P53 is rejected by a direct match. Point P54 has been predicted but it is evident that a match is not required for rejection inasmuch as the point is not stable, that is, is not on the line. As a result, point P70 is the only point on the scan line L3 which meets all requirements for acceptance as a new initial point.

The invention also includes a feature which meets the problem posed by the points on the scan line L13. Assume that the scanning mode is being employed to locate a possible fourth initial point. Points P69 and P56 are correctly disqualified as new initial points because both have been predicted by extrapolation and stored. Point P57, being an adjacent point, is also disqualified. The ensuing run of horizontal points, namely points P58 through Q50, are correctly disqualified as new points by an additional matching procedure. FIG. 1 shows a last-disqualified-point counter 48 and a comparator 49. The address of the last disqualified point is received by the counter 48 and the test for a match between such a point and the spot address is effected by the comparator 49. In the event of a match, an output signal from the comparator inhibits the appropriate section of the logic control center 29 and the tested point is accordingly disqualified. Accordingly, each successive point on a previously traced line which coincides with a scan line is disqualified in an operation which is analogous to a propagating chain reaction.

FIGS. 5A and 5B comprise a somewhat more detailed presentation of selected units of the equipment shown in the embodiment of FIG. 1. In particular, FIGS. 5A and 5B show, schematically, the circuits of the logic control center of FIG. 1 which interconnect and control the operation of certain of the major units of the system. The designating numerals and characters employed in FIG. 1 are used to indicate corresponding units in FIGS. 5A and 5B. In some instances, two or more units of apparatus in FIGS. 5A and 5B correspond to a single unit in FIG. 1. For example, the spot-address counter 31 of FIG. 1 comprises the $x$-coordinate-spot-address counter $31x$ and the $y$-coordinate-spot-address counter $31y$ of FIG. 5A. Other counters and comparators have been similarly designated to indicate separate and distinct processing of $x$-coordinate and $y$-coordinate information.

As noted in the discussion of FIG. 1, the location of an initial point on a line to be traced is a substantially straightforward process employing equipment and techniques analogous to the television art. The significant features of the invention deal primarily with the various combinations of apparatus which effect the tracing of a line pattern in incremental steps. Accordingly, in the discussion of the operation of the system shown in FIGS. 5A and 5B, it is assumed that an initial point has already been located and that the tracing spot rests on some subsequent valid, stable point on the line just prior to the initiation of a search for adjacent stable points.

Figure 6A:
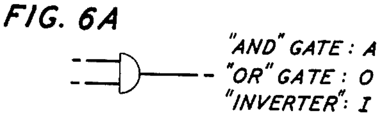
Figure 6B:
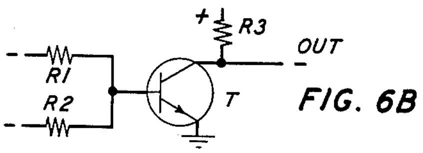

Throughout FIGS. 5A and 5B, certain conventions are employed with respect to the operation and designation of OR gates, AND gates and flip-flops. These conventions are illustrated in FIGS. 6A through 6D. FIG. 6A shows the conventional semicircular figure employed to represent an AND or an OR gate. A gate may, for example, comprise a single transistor T, as shown, with inputs applied by way of resistors R1 and R2. Positive bias to the collector is applied by way of resistor R3. Accordingly, for AND gate operation, inputs are at ground potential and the output is at a positive potential. For OR gate operation, input and output potentials are the reverse. The gate symbol of FIG. 6A when marked with an "I" is employed to designate an "inverter," a device which may take any one of a number of conventional forms. An inverter is employed to convert the positive potential output of an AND gate to a ground potential signal for application as an input to a succeeding AND gate.

Figure 6C:
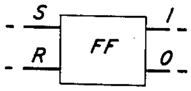
Figure 6D:
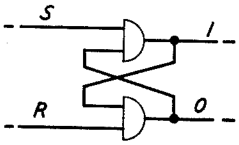

The convention employed for a flip-flop is shown in FIG. 6C. Input leads are designated S and R for "set" and "reset," respectively, and corresponding output leads are designated 1 and 0. As shown in FIG. 6D the flip-flop may comprise cross-connected AND gates of the type shown in FIG. 6B. Accordingly, a "set" input requires a positive potential which results in a ground potential at the "1" output. For the reset operation, polarities are the reverse.

In FIG. 5A the tracing clock 40 produces a sequence of pulses, C1 through C14, and each is applied to one or more corresponding output leads as indicated. A similar designation is employed to indicate the input points in the system to which each respective clock pulse output lead is coupled. Clock pulse C1 is applied to the $x$-coordinate-spot-address counter $31x$ by way of OR gate 101. This action increments the address in the counter 31$x$ by one unit, in other words the counter is stepped by $+\Delta x$. Additionally, a corresponding movement of the tracing spot is effected by directing the pulse C1 over lead 108 to the scanner by way of the deflection control circuitry, not shown.

At the same time the $x$-address is incremented, clock pulse C1 is applied to AND gate 126 by way of OR gate 124 and delay circuit 125. AND gate 126 performs a key function in that it provides a test for both the stability and the validity of the $+\Delta x$ trial point. The stability test is met by a signal on lead 206 indicating that the spot coincides with a coordinate grid dot and by a signal on lead 205 indicating that the tracing spot coincides with a point on the line being traced. These signals are generated as described above in the discussion of FIG. 1. Two additional inputs are required to operate AND gate 126. The comparator 30$x$ applies an output signal to OR gate 113 in the absence of a match between the address in the $x$-coordinate-previous-point-address counter 32$x$ and the $x$-coordinate-spot-address counter 31$x$. Similarly, in the absence of a match between the $y$-coordinate of the $y$-coordinate-previous-point-address counter 32$y$ and the $y$-coordinate of the spot-address-counter 31$y$, an input is applied to OR gate 113 from the comparator 30$y$. Consequently, an output from OR gate 113 indicates a mismatch of either the $x$ or the $y$-coordinate. The mismatch signal from OR gate 113 is applied as an input to AND gate 126 by way of lead 207.

Similarly, a mismatch signal is applied to AND gate 126 by way of lead 208 from OR gate 114 if there is a mismatch signal from either comparator 34$x$ or 34$y$. These two comparators test for concidence between the address of the spot and the address of the initial point. With each of the five required inputs present, AND gate 126 applies an output signal to each of the AND gates 127 through 130. Only AND gate 130 has been enabled, however, which was effected by the application of clock pulse C1 from the output of OR gate 101 over lead 209. The resulting output from AND gate 130 is applied to the $+x$ temporary flip-flop (TFF) 135 as a "set" input which in effect provides a temporary memory of the fact that the $+\Delta x$ trial point has been tested and found to be both stable and valid, that is, it is a point on the line being traced and it coincides with neither the immediately previous point, nor with the initial point.

The next sequence of operations is initiated by clock pulse C2 which is applied by way of OR gate 102 to lead 107 to decrement $(-\Delta x)$ the $x$-coordinate-spot-address counter 31$x$. The convention of applying incrementing inputs to the left side of counters and decrementing inputs to the right side is employed. Additionally, clock pulse C2 is applied to lead 107 which, through the deflection control circuitry and scanner (FIG. 1), results in moving the tracing spot back to the base location of the increment search.

As shown, the logic control circuitry is programmed to establish the $-y$ direction as the next preferred direction of search. This phase of the operation is initiated by clock pulse C3. Clock pulse C3 is applied by way of OR gate 104 over lead 212 to decrement $(-\Delta y)$ the $y$-coordinate-spot-address counter 31$y$. A corresponding step of the scanning spot is effected by applying clock pulse C3 to lead 105. Clock pulse C3 performs two additional functions, namely, enabling AND gate 127 and providing one of the five required inputs to AND gate 126 by way of OR gate 124 and the delay circuit 125. The delay circuit 125 is required to ensure time coincidence of all of the inputs to AND gate 126. Assuming that the remaining four inputs to AND gate 126 have been applied as explained in the $+\Delta x$ phase of the operation, the output from AND gate 126 operates AND gate 127, previously enabled by clock pulse C3, and the output from AND gate 127 sets the $-y$ temporary flip-flop 136. Temporary storage is provided thereby for the information that the $-\Delta y$ point has been tested and found to be stable and valid.

Clock pulse C4, by way of OR gate 103, increments $(+\Delta y)$ the $y$-coordinate-spot-address counter 31$y$ and also enables AND gate 128 by way of the conducting path which includes OR gate 103 and lead 213. The scanning spot is returned to the base point of the increment search by the application of clock pulse C3 to the deflection control circuitry of the scanner by way of OR gate 103 and lead 106.

Clock pulse C5 controls a trial of the $-\Delta x$ point in substantially the same fashion that clock pulses C1 and C3 control the $+\Delta x$ and $-\Delta y$ phases, respectively. If the $-\Delta x$ point is stable and valid, an output is produced by AND gate 129 by virtue of the two inputs received, namely clock pulse C5 and the output from AND gate 126. The output of AND gate 129 sets the $-x$ TFF 137.

Clock pulse C6, applied through OR gate 101 performs a resetting function analogous to that performed by clock pulses C2 and C4, described above.

The final phase of the increment search, $+\Delta y$, is initiated by clock pulse C7. Assuming in this instance that each of the three previous steps resulted in the location of an acceptable point, it is apparent that the "previous point" must be in the $+y$ direction from the search point and accordingly the $+\Delta y$ point must be rejected to preclude retracing. Rejection is accomplished by the absence of a mismatch signal from either comparator 30$x$ or comparator 30$y$. Accordingly, there is no output from OR gate 113 and no signal is applied to AND gate 126 by way of lead 207. In the absence of an output from AND gate 126, AND gate 128, which is enabled by clock pulse C7 over lead 213, remains inoperative and no setting signal is applied to the $+y$ TFF 138.

The final return of the system to the search point condition is effected by clock pulse C8, which acts through OR gate 104 to decrement the $y$-coordinate-spot-address counter 31$y$ by way of lead 212, and to supply a suitable input to the deflection control circuitry by way of lead 105.

The operations thus far described comprise the testing of each of four trial points for their acceptability as new points. A successful candidate has been located in each of the directions $-x$, $-y$, and $+x$, and this information is stored in the TFF's 135, 136, and 137.

A number of operations remain which, among others, includes the final processing of information for transmission purposes and the storing of other information for subsequent use. The performance of the first of these functions is initiated by clock pulse C9 which is applied to lead 214 for the purpose of performing a rank order selection among the TFF's, 135 through 138 in the order of exploration $(+x, -y, -x, +y)$, that is, a determination of the first flip-flop in that order which has been set. It will be recalled that TFF 135 is in the set condition, its output is therefore a "1" or ground potential which is applied as the second input to AND gate 139. Assuming an opposite condition for the TFF 135, it is apparent that AND gate 143 would be operated and its output, applied through inverter 144 together with a "1" output from TFF 136 would result in the operation of AND gate 140. If neither AND gate 139 nor AND gate 140 is operated, clock pulse C9 is applied as an input to AND gate 141 over the obvious path and, assuming a set condition for TFF 137, AND gate 141 is operated. Similarly, if no one of the AND gates 139 through 141 is operated, clock pulse C9 will operate AND gate 142, assuming that it is first enabled by the set condition of TFF 138.

An output from any one of the AND gates 139 through 142 sets a corresponding one of the "fixed" flip-flops (FFF) 149 through 152. Accordingly, under the conditions initially assumed, FFF 149 is set. The resulting output is applied by way of lead 215 and OR gate 131 to reset TFF 135. Similarly, the setting of any of the FFF's 150 through 152 results in the resetting of a corresponding one of the TFF's 136 through 138.

At this point, the $+x$ direction has been selected as the preferred step but before transmitting this information it is necessary to store information indicating that both the $-y$ and $-x$ directions have been explored successfully. The performance of this function is initiated by clock pulse C10 which is applied to each of the branch-store transfer AND gates 117 through 123. AND gates 117 and 118 are illustrative of a relatively large group of AND gates, the number depending on the number of information bits required to encode the spot address. If, for example, 20 bits are required then AND gates 117 and 118 are illustrative of a group of ten and each has an input from a corresponding output lead such as lead 203 or 204 from the $x$-coordinate-spot-address counter 31$x$. Similarly, AND gates 119 and 120 are illustrative of a second group of ten AND gates and each has an input lead connected to a corresponding one of the output leads, such as 216 or 217, from the $y$-coordinate-spot-address counter 31$y$.

Accordingly, the output or lack of output from each of the AND gates 117 through 120, which is dependent on coincidence or lack of coincidence between clock pulse C10 and a respective output from one of the counters 31$x$ or 31$y$, defines the spot address in binary terms. A somewhat different function is performed by AND gates 121 through 123 in that an output signal indicates a coordinate direction rather than an address. Information indicating a coordinate direction is termed a "notation" and in the coordinate system employed herein there are of course four possible notations, namely, $+x$, $-y$, $-x$, and $+y$. However, it is necessary to provide for the transfer of only three such branch-point notations inasmuch as one direction must necessarily be pursued immediately after the completion of an increment search and, accordingly, storage of that direction is not required. In the programming scheme shown, the $+x$ notation is preferred and consequently there is no $+x$ notation AND gate. Further, it is obvious that no memory of the direction of the "previous point" need be retained and hence, for any particular branch point, a maximum storage of only two branch-point notations is required.

The operation of AND gate 121 ($-y$ notation) results from a coincidence between clock pulse C10 and a set or "1" output signal from TFF 136 which is applied to lead 220. Similarly, AND gate 122 transfers a $-x$ notation to the branch store by virtue of coincidence between clock pulse C10 and a set or "1" output from TFF 137. TFF 138 has not been set, no signal is applied to lead 218 and consequently, there can be not output from AND gate 123.

At this point it should be noted that the first one of the TFF's 135 through 138 which is set, is always reset by an output set signal from its corresponding FFF. For example, the "1" output from FFF 151 is applied to OR gate 132 by way of lead 221 and thence to the reset input point of TFF 136. The purpose of the resetting action described is to ensure that a notation of the first or preferred direction of travel is never sent to the branch store. In general then, if there are two successful notations, only one is sent to the branch store.

The next clock pulse C11 is applied as an input to each of the OR gates 131 through 134 and a corresponding output is applied to reset each of the TFF's 135 through 138. The only memory then remaining in the system, aside from the branch store and the various $x$ and $y$ counters, is that provided by the condition of FFF 149 which was set by the output of AND gate 139.

Clock pulse C12 is employed to up-date the address in the counter 31$x$ to correspond to the newly accepted $+\Delta x$ point. This action also serves to shift the spot position, which, as noted in the explanation of FIG. 1, is under the control of the spot-address counter 31. Operation of the counter 31$x$ is effected by an output from AND gate 109, the inputs to which comprise clock pulse C12 and an output set signal from FFF 149. Similar apparatus, not shown, is employed to up-date the previous-point-address counter 32$x$.

The next clock pulse, C13, is employed to operate AND gate 153, previously enabled by a signal from the output of the energized FFF 149. The diode matrix, comprising diodes 167 through 171, is designed to produce a distinctive binary code pattern identifying the particular one of the AND gates 153 through 156 which has been operated. For AND gate 153, indicating the $+x$ direction, the pattern is 00, and for the $-y$, $-x$, and $+y$ directions the codes are 10, 01, and 11, respectively. Shift registers 172 and 173 convert the parallel "word", in this instance 00, to serial form which is then used to modulate the carrier signal generated by the transmitter 174.

At the receiving end, the receiver 175 applies the demodulated signal to the shift registers 176 and 177 which convert it to parallel form. AND gates 178 through 181 operate as decoders. In this instance, AND gate 178 produces an output which may be employed in conventional fashion to reproduce the excursion of the beam in the transmitting system. Successive excursions may then be employed to reconstruct the contour of the line being traced.

Certain of the functions outlined in the discussion of FIG. 1, for example the tracing of multiple line patterns, are not shown in FIGS. 5A and 5B. In general, however, the details of implementing these functions are closely analogous to the basic system shown in FIGS. 5A and 5B and in the light of the principles of the invention, suitable apparatus for performing these functions may readily be designed by persons skilled in the art.

One additional operation is carried out at the transmitting end before the system is ready to undertake the next increment search. Clock pulse C14 is applied directly to each of the FFF's as a common reset signal, resetting whichever one of the FFF's was set, in this instance the $+x$ FFF 153.

Some mention should be made of the situation that obtains when an increment search is unsuccessful, as opposed to the case described in which the $+\Delta x$, $-\Delta y$ and $-\Delta x$ points all were found to be qualified. When none of the trial points qualify, none of the TFF's 135 through 138 is set and the resulting coincidence of outputs from the TFF's with clock pulse C9 operates AND gate 182. The output of AND gate 182 is in turn applied to the branch store, not shown, as an interrogating signal. If the branch store holds the address of a branch point together with one or more branch notations, that address and the preferred notation is sent from the branch store, in response to the interrogating signal, to the counter 31$x$ over leads such as 226 and 227. It will be understood that these leads are illustrative of a group of leads, a group of ten, for example, in which each lead is employed for a respective address bit. Similarly, information is transmitted to the counter 31$y$ by way of leads from the branch store, not shown.

In all cases, it is understood that the above-described arrangements are merely illustrative of the principles of the invention. Numerous and varied other embodiments may be devised in accordance with these principles by those skilled in the art without departing from the spirit and scope of the invention.

What is claimed is:

1. In a facsimile system for transmitting the contour of a line pattern in a field, in combination, a coordinate grid comprising an array of evenly spaced rows and columns of coordinate dots, adjacent ones of said dots being separated by a common incremental distance, a light-beam source, means for focusing said beam into a spot of light imaged on said grid to coincide with one of said dots and imaged on said field to coincide with an initial point on said line, means jointly responsive to the video return from said last one of said dots and from said initial point for initiating a local search for points on said line adjacent to said initial point, said last named means comprising means for shifting said spot in succession in each of four coordinate directions by said incremental distance to each of four trial locations and back to said initial point, means for generating and storing a signal indicative of the address of said initial point, first means for translating said address of said initial point into an electrical signal for transmission, means for generating and storing a signal indicative of the coordinate direction of each of said trial locations from said initial point, which trial location corresponds in position both to a point on said line and to one of said coordinate dots, means operative after the completion of said local search for shifting said spot to a preferred one of said trial locations which coincides with a point on said line, second means for translating the direction of said shifting to a distinctive electrical signal for transmission, means operative upon the coincidence of one of said trial locations with a previous one of said trial locations for inhibiting said second translating means, means, including said coordinate direction storing means, operative upon the failure of one of said local searches to locate a new point on said line, for initiating the incremental step tracing of branches on said line not previously traced, and means for generating a distinctive signal for transmission indicating the termination of the trace of said line.

2. In a facsimile system for transmitting the contour of a line pattern in a field including a main line with at least one branch point and at least one branch line extending from each of said branch points, in combination, means establishing a system of coordinates by which location of points on said line pattern in relation to said field may be expressed, scanning means for approximately tracing the contour of said main line by a substantially continuous series of discrete steps, each step having an incremental distance and a coordinate direction defined by said system of coordinates, means including said scanning means, operative during the tracing of said main line, for locating said branch points and the coordinate direction of the respective branches extending from said branch points, means for storing the coordinate address of each of said branch points and the coordinate direction of said branches from their respective branch points, means including said scanning means and said storing means operative upon the termination of the tracing of said main line for tracing in succession each of said branch lines by a respective substantially continuous series of said discrete steps, and means responsive to said scanning means for translating the coordinate direction of each of said discrete steps into a corresponding electrical signal.

3. A communication system for the transmission of signals representative of a line pattern on an object field comprising, in combination, first means for generating a sequence of regularly-occurring clock pulses, image-scanning means responsive to said clock pulses for scanning said field in raster fashion, second means for generating a sequence of regularly-occurring clock pulses, means operative upon the location of an initial point on said line by said scanning means for shifting control of said scanning means from said first clock pulse generating means to said second clock pulse generating means, means including said scanning means responsive to said second clock pulse generating means for tracing the contour of said line in a series of incremental steps, each of said steps being in a respective one out of four mutually perpendicular coordinate directions, each of said steps having a common incremental length, means responsive to said scanning means for translating each of said steps into a corresponding electrical signal indicative of a respective one of said coordinate directions, and means for converting said electrical signals into a pulse code, whereby, upon the transmission of said pulse code to a receiving station said code may be reconstituted to form a visual image of said line.

4. Apparatus in accordance with claim 3 wherein said tracing means includes means operative immediately prior to each of said tracing steps for deflecting said scanning means in a search pattern, said search pattern comprising one of said incremental steps, and a reverse step, in each of said coordinate directions in a preassigned order.

5. A communication system for the transmission of signals representative of a line pattern in a first object field, comprising, in combination, an array of evenly spaced mutually perpendicular rows and columns of coordinate dots in a second object field, said rows and columns defining four mutually perpendicular coordinate directions, said object fields being substantially equal in size whereby the address of points on said line may be expressed in terms of the system of coordinates defined by said array, photoelectric scanning means for producing a first video return signal from any selected one of a plurality of elemental areas of said first field and a second video return signal from a like elemental area correspondingly located on said second field, means including first clock pulse generating means for controlling said scanning means in raster fashion in successive horizontal stepping sweeps corresponding to said rows of dots, each of said dots marking the center of one of said elemental areas, counting means for registering the coordinate address of the elemental area defined by said scanning means, means for generating a respective output signal operative upon each coincidence between said first video return from an elemental area which includes a portion of said line and said second video return from an elemental area which includes one of said dots, means jointly responsive to the first one of said output signals occurring during the course of said raster scan and to said first clock pulse generating means for translating the coordinate address of an initial point on said line, as registered by said counting means, into a pulse code for transmission, whereupon the control of said scanning means is shifted to a second clock pulse generating means, means jointly responsive to said second clock pulse generating means and to successive ones of said output signals for deflecting said scanning means in a series of incremental steps approximating the contour of said line, each of said steps having a length equal to the distance between adjacent ones of said dots and a direction corresponding to one of said coordinate directions, means for translating each successive one of said steps into a signal indicative of the direction of said step, and means for translating each of said direction signals into a pulse code for transmission.

6. Apparatus in accordance with claim 5 including first means for inhibiting the successive generation of signals indicative of the address of the same point on said line.

7. Apparatus in accordance with claim 6 wherein said first inhibiting means comprises a counter for registering the coordinate address of the last point on said line for which a corresponding signal has been encoded for transmission, means for comparing the address in said last named counter and the address in said counting means and means for generating an inhibiting signal responsive to said comparing means and operative upon the determination of a match between said last two named addresses.

8. Apparatus in accordance with claim 6 including second means for inhibiting the generation of more than one signal indicative of the address of the initial point on said line marking the inception of the tracing of said line by said scanning means.

9. Apparatus in accordance with claim 8 wherein said second inhibiting means comprises a counter for registering the coordinate address of said initial point, means for comparing the address in said last named counter and the address in said counting means and means for generating an inhibiting signal responsive to said comparing means and operative upon the determination of a match between said last two named addresses.

10. Scanning apparatus for tracing the contour of a line in a field, comprising, in combination, a reference field comprising mutually perpendicular rows and columns of coordinate dots, said rows and columns establishing four coordinate directions, adjacent ones of said dots being separated by a distance substantially equal to the average width of said line, a light source, means for directing a first beam from said source to an initial point on said line and for directing a second beam from said source to one of said coordinate dots, means jointly responsive to the video return from one of said dots and to the video return from said line for directing said beams in a search pattern, said pattern comprising a forward step and a reverse step in each of said coordinate directions, each of said steps corresponding in length to the common distance between adjacent ones of said dots, means for temporarily storing an indication of which of said forward steps results in a video return from said line and in a video return from one of said coordinate dots, means, including said directing means, responsive to said storing means and operative upon the termination of said search pattern for shifting the position of said beams by one of said coordinate steps in a direction corresponding to the first one of said indications stored by said storing means during said search pattern, whereupon said beams are directed, alternately, in one of said search patterns and in one of said coordinate steps, whereby the movement of said first beam approximates the contour of said line by a series of said coordinate steps, each of said steps being preceded by and followed by one of said search patterns.

11. Apparatus in accordance with claim 10 including means responsive to said temporary storing means for storing all but the first of said indications for each of said search patterns.

12. Apparatus in accordance with claim 11 including means operative upon the failure of one of said search patterns to produce a coincidence between a video return from said line and a video return from one of said dots for interrogating said last named storing means whereby said beam-directing means may be returned successively to points on said line having addresses stored in said last named storing means to enable the successive tracing of branches of said line.

13. A facsimile system for converting the contour of a line in a field into a series of binary code pulse signals comprising, in combination, means establishing a system of rectangular coordinates defining an incremental unit distance and four coordinate directions whereby the coordinate address of points on said line may be defined, means for photoelectrically scanning the field of said line thereby to develop a video return having characteristics indicative of whether the position of said scanning means coincides with a point on said line, means including said scanning means for locating an initial point on said line, means for converting the coordinate address of said initial point into electrical pulses in binary code form suitable for transmission, means operative after the location of said initial point and responsive to said video return for deflecting said scanning means in a series of steps tracing the contour of said line, each of said steps being defined by said incremental unit distance and by a respective one of the coordinate directions of said coordinate system, and means for translating each of said steps into a respective binary pulse code signal suitable for transmission and indicative of the direction of said last named step, whereby the binary code pulses defining said initial point and the binary code pulses defining each successive one of said steps may be transmitted and reconstituted to indicate the contour of said line at a distant station.

References Cited in the file of this patent

UNITED STATES PATENTS

| | | |
|---|---|---|
| 2,121,211 | Padva | June 21, 1938 |
| 2,489,305 | McLennan | Nov. 25, 1949 |
| 2,945,956 | Frank | July 19, 1960 |